3,287,308
NOVEL INKS OF HIGH VINYLIDENE
CHLORIDE-CONTENT COPOLYMERS
Paul D. Whyzmuzis, Clifton, N.J., and Howard Roth, Ridgewood, Richard Bolstad, Brooklyn, and Elihu J. Aronoff, Glen Oaks, N.Y., assignors to Interchemical Corporation, New York, N.Y., a corporation of Ohio
No Drawing. Filed Jan. 31, 1964, Ser. No. 341,752
8 Claims. (Cl. 260—31.2)

This invention relates to novel inks containing new copolymers of high vinylidene chloride content, that is copolymers comprising at least 65 to 70% vinylidene chloride.

Copending application S.N. 341,701 entitled, "Novel Compositions of High Vinylidene Chloride-Content Copolymers," in the names of R. Bolstadt, E. Aronoff, P. D. Whyzmuzis and E. Maloney filed on or about the same date as the present application, which is hereby incorporated by reference, is directed to novel low molecular weight copolymers of at least 70% vinylidene chloride and acrylic acids or itaconic acid which comprise most of the remainder of the copolymer. As used in this specification and claims, "acrylic acids" is meant to be generic to both acrylic and methacrylic acids. These novel copolymers have a molecular weight in the range of 2,000 to 5,000 preferably 3,000 to 5,000.

In addition to the vinylidene chloride and acid components in the proportion described above, the novel copolymers of the copending application may further contain any of a wide variety of olefinically unsaturated monomers. These olefinically unsaturated monomers may include nitriles, such as acrylonitrile and methacrylonitrile; the alkyl esters of acrylic and/or methacrylic acids such as ethyl hexyacrylate and octyl acrylate but for best results lower alkyl acrylates are preferred (these are defined as the $C_1$ to $C_4$ alkyl esters of acrylic and/or methacrylic acids) such as methyl, ethyl, propyl and butyl acrylates as well as methyl methacrylates; alkyl esters of itaconic acid, particularly lower itaconic esters such as methyl itaconate, butyl itaconate, dimethyl itaconate and dibutyl itaconate; nitrogen-vinyl polymers such as N-vinyl-2-pyrrolidone; vinyl ketones such as methyl vinyl ketone, ethyl vinyl ketone and vinyl phenyl ketone; acrolein and methacrolein amides such as acrylamide, methacrylamide, methylolacrylamide and methylolmethacrylamide; hydroxy compounds such as ethylene glycol monoacrylate and monomethacrylate, propylene glycol monoacrylate and monomethacrylate, glycerol monoacrylate and monomethacrylate, and hydroxyethyl methacrylate; glycidyl acrylate and glycidyl methacrylate; styrene, alphamethyl styrene and the various vinyl toluenes; ethylene glycol dimethacrylate; chloroprene and isoprene; cyclopentadiene and substituted cyclopentadiene such as dihydroxy cyclopentadiene; 2-hydroxymethyl-5-norbornene; maleic anhydride as well as esters of unsaturated dibasic acids such as dimethyl maleate and dibutyl fumarates; vinyl esters such as vinyl acetate; vinyl propionate and vinyl stearate as well as vinyl chloride; and vinyl alkyl ethers such as vinyl butyl ether, vinyl ethyl ether and vinyl hexyl ether.

In addition to being soluble in powerful solvents such as furans and dioxan in which other high vinylidene chloride-content copolymers may also be soluble, the novel copolymers of the copending application are highly soluble in volatile ketone solvents such as acetone, methyl ethyl ketone, methyl isobutyl ketone and cyclohexanone and volatile ester solvents such as methyl acetate, ethyl acetate, propyl acetate and butyl acetate. In these solvents, high solid content solutions are obtainable at coating viscosities. As set forth in said copending application, at solids contents of 20% to 40%, such coating compositions have low viscosities substantially below 2000 cps.

The copolymers of the copending application, are also soluble in aliphatic alcohols, particularly saturated $C_1$ to $C_4$ aliphatic alcohols. The alcohols which have been tried as solvents include methanol, ethanol, isopropanol, n-propanol and n-butanol. The copolymers are soluble in these alcohols either alone or in the presence of small amounts of either volatile ester or ketone type solvents.

For example, the copolymers of vinylidene chloride and itaconic acid dissolved in $C_1$ to $C_4$ saturated aliphatic alcohols provide excellent coating compositions. It has been noted that in the solutions of the copolymers of vinylidene chloride and acrylic acids in alcohols alone, there is some cloudiness. This is due to the precipitation of very small amounts of the copolymer out of solution. However, the great bulk of copolymer remains in solution and the precipitate has been found to have no effect on the properties of the coating or inks made from said copolymer. However, even this tendency toward precipitation of small amounts of the copolymer may be eliminated by the inclusion of small amounts, preferably 2% to 20% of the total solvent content of a volatile ester or ketone solvent as a cosolvent with the alcohol.

Also hydrocarbons, both aromatic and aliphatic may be used as cosolvents with the aliphatic alcohols. The aromatic solvents which may be used include toluene, xylene, benzene and chlorobenzene. Any conventional aliphatic hydrocarbon coating solvent may be used. Solvents having boiling ranges in the range of from 130° F. up to 550° F. and K.B. values in the range of from 30 to 45 have been used.

In addition to their unique high solubility properties permitting the formulation of high solids content solutions at coating viscosities in a variety of solvents which greatly facilitates coating operations and markedly reduces solvent loss, the copolymers of the copending application provide coatings of very low moisture vapor transmission and gas permeability, increased resistance to grease, high gloss, flexibility, high stability, particularly in the presence of heat or ultraviolet light and good adhesion to substrates. In addition, coatings of the copolymers display excellent adhesion to a wide variety of substrates.

We have now found that novel inks may be formulated by adding conventional pigments and 4,4-bis-(4-hydroxyphenyl) pentanoic acid to the components of the coating compositions described in the copending application.

While the addition of pigments alone to the coating compositions of the copending application results in satisfactory colored coating compositions, the resulting pigmented compositions display thixotrophy which is very undesirable for most ink applications. Also pigmentation reduces adhesion to some extent for many of the substrates. In addition, with some pigments such as the Lithol group and Cyan Blue group, gloss is greatly reduced in the coating.

We have found, however, that by also incorporating Diphenolic acid (4,4 - bis(4 - hydroxyphenyl) pentanoic acid) in addition to the pigment, undesirable thixotrophy is substantially eliminated and adhesion is increased in a wider variety of substrates. Also, the loss of gloss is remedied.

The vehicle, which term is used to describe the solution of the binder in the solvent, may be of the same composition and proportions as any of the coating compositions described in the copending application. The 4,4-bis(4-hydroxyphenyl) pentanoic acid preferably equals from 10% to 50% and most preferably from 20% to 25% of the weight of the vinylidene chloride copolymer weight. The pigment is present in conventional amounts which will vary with the nature of the pigment used. In general the pigment may constitute from 10% to 60% of the total ink weight.

Except for iron pigments, particularly pigments with reactive iron groups, substantially all conventional pigments may be used including titanium dioxides, chrome yellows, lithol pigments, barium pigments, calcium pigments and phthalocyanine blue pigments.

It should be noted in the present specification and claims, all proportions are by weight unless otherwise stated.

The following examples will further illustrate the practice of this invention:

*Example 1*

| | Parts by weight |
|---|---|
| Vinylidene chloride | 75 |
| Acrylic acid | 25 |
| n-Propyl acetate | 54 |
| Lauryl peroxide | 3 |

The above ingredients are placed in a kettle and maintained at a temperature of 60° C. under an inert atmosphere for 17 hours with continuous agitation. There is a 100% conversion of monomeric material to the copolymer.

*Example 2*

| | Parts by weight |
|---|---|
| The copolymer solution of Example 1 | 15 |
| Ethanol | 57 |
| n-Propyl acetate | 8 |
| 4,4-bis(4-hydroxyphenyl) pentanoic acid | 5 |
| Phthalocyanine blue pigment | 15 |

The resulting ink exhibits substantially no thixotropy. Using a flexographic press, the ink is used in printing upon the following substrates: cellophane, cellophane carrying a coating of Saran (vinylidene chloride-acrylonitrile copolymer), Saran film, cellulose acetate, Mylar film (polyethylene terephthalate), polyethylene, glassine, stainless steel, aluminum sheet, copper, zinc, tin plate and black iron. The printed film is dried at 180° F. for 10 seconds.

The resulting printing has excellent gloss, flexibility and hardness. The printed stock in each case is tested for block resistance by placing 2 printed surfaces to face with each other under a pressure of two pounds per square inch and heated at 150° F. for 2 hours. After this period, the two surfaces are permitted to cool and then peeled apart. The two surfaces peel apart with substantially no sticking, indicating excellent block resistance.

In all cases set forth above, the inks exhibit good adhesion to the substrate.

*Example 3*

| | Parts by weight |
|---|---|
| Copolymer of 75% vinylidene chloride methacrylic acid prepared in accordance with the procedure of Example 1 | 10 |
| n-Propanol | 58 |
| Ethyl acetate | 12 |
| 4,4-bis(4-hydroxyphenyl) pentanoic acid | 5 |
| Barium lithol red pigment | 15 |

The above ingredients are mixed to form an ink which has substantially the same properties as does the ink of Example 2.

*Example 4*

| | Parts by weight |
|---|---|
| Copolymer of 75% vinylidene chloride and 25% itaconic acid prepared in accordance with the procedure of Example 1 | 10 |
| Isopropanol | 60 |
| Methyl ethyl ketone | 10 |
| 4,4-bis(4-hydroxyphenyl) pentanoic acid | 5 |
| Phthalocyanine blue pigment | 15 |

The above ingredients are mixed to form an ink which has substantially the same properties as does the ink of Example 2.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A vinylidene chloride-vinyl acid copolymeric ink composition comprising pigment dispersed in a solution, in a saturated $C_1$ to $C_4$ aliphatic alcohol, of
    (A) a copolymer comprising at least 70% vinylidene chloride and a major portion of the remainder of the copolymer being an acid selected from the group consisting of acrylic acid, methacrylic acid and itaconic acid, and
    (B) 4,4 - bis(4 - hydroxyphenyl) pentanoic acid, the weight of said 4,4-bis(4-hydroxyphenyl) pentanoic acid equaling from 10 to 50% the weight of the copolymer.

2. The ink of claim 1 wherein said acid is acrylic acid.

3. The ink of claim 1 wherein said acid is methacrylic acid.

4. The ink of claim 1 wherein said acid is itaconic acid.

5. A vinylidene chloride-vinyl acid copolymeric ink composition comprising pigment dispersed in a solution of 4,4-bis(4-hydroxyphenyl) pentanoic acid and a copolymer of 70% to 80% vinylidene chloride and at least 15% of an acid monomer selected from the group consisting of acrylic acid, methacrylic acid and itaconic acid in a volatile organic solvent comprising a saturated $C_1$ to $C_4$ aliphatic alcohol and a member selected from the group consisting of ketone solvents consisting of acetone, methyl ethyl ketone, methyl isobutyl ketone and cyclohexanone and ester solvents consisting of methyl acetate, ethyl acetate, propyl acetate and butyl acetate, said alcohol being a major portion of said solvent and the weight of said 4,4-bis(4-hydroxyphenyl) pentanoic acid equaling from 10 to 50% the weight of the copolymer.

6. A vinylidene chloride-vinyl acid copolymeric ink composition comprising pigment dispersed in a solution of 4,4-bis(4-hydroxyphenyl) pentanoic acid and a copolymer of 70 to 80% vinylidene chloride and at least 15% acrylic acid, the weight of said 4,4-bis(4-hydroxyphenyl) pentanoic acid equaling from 10 to 50% the weight of the copolymer in a volatile organic solvent comprising from 2% to 20% ester solvent selected from the group consisting of methyl acetate, propyl acetate and butyl acetate and the remainder a saturated $C_1$ to $C_4$ aliphatic alcohol.

7. An ink comprising pigment dispersed in a solution of 4,4-bis(4-hydroxyphenyl) pentanoic acid and a copolymer of 70% to 80% vinylidene chloride and at least 15% acrylic acid, the weight of said 4,4-bis(4-hydroxyphenyl) pentanoic acid equaling from 10 to 50% the weight of the copolymer in a solvent comprising from 2% to 20% ketone solvent selected from the group consisting of acetone, methyl ethyl ketone, methyl isobutyl ketone and cyclohexanone and the remainder saturated $C_1$ to $C_4$ aliphatic alcohol.

8. A vinylidene chloride-vinyl acid copolymeric ink composition comprising pigment dispersed in a solution of 4,4-bis(4-hydroxyphenyl) pentanoic acid and a copolymer of 70% to 80% vinylidene chloride and at least 15% of an acid monomer selected from the group consisting of acrylic acid, methacrylic acid and itaconic acid, the weight of said 4,4-bis(4-hydroxyphenyl) pentanoic acid equaling from 10 to 50% the weight of the copolymer in a volatile organic solvent comprising a minor portion of a saturated $C_1$ to $C_4$ aliphatic alcohol, a minor portion of a member selected from the group consisting of ketone solvents consisting of acetone, methyl ethyl ketone, methyl isobutyl ketone and cyclohexanone and ester solvents consisting of methyl acetate, ethyl acetate, propyl acetate and butyl acetate and a major portion of a volatile hydrocarbon solvent.

References Cited by the Examiner
UNITED STATES PATENTS

| | | | |
|---|---|---|---|
| 2,819,984 | 1/1958 | Ackerman | 260—87.7 |
| 2,933,521 | 4/1960 | Greenlee | 260—31.2 |
| 3,070,564 | 12/1962 | Roeser. | |

FOREIGN PATENTS 654,342  6/1951  Great Britain.

MORRIS LIEBMAN, *Primary Examiner.*

L. T. JACOBS, *Assistant Examiner.*